United States Patent
Zhou

(10) Patent No.: US 9,916,027 B2
(45) Date of Patent: Mar. 13, 2018

(54) INFORMATION PROCESSING METHOD AND ELECTRONIC DEVICE

(71) Applicants: Beijing Lenovo Software Ltd., Beijing (CN); Lenovo (Beijing) Limited, Beijing (CN)

(72) Inventor: Zhiqiang Zhou, Beijing (CN)

(73) Assignees: BEIJING LENOVO SOFTWARE LTD., Beijing (CN); LENOVO (BEIJING) LIMITED, Beijing (CN)

(*) Notice: Subject to any disclaimer, the term of this patent is extended or adjusted under 35 U.S.C. 154(b) by 66 days.

(21) Appl. No.: 14/195,052

(22) Filed: Mar. 3, 2014

(65) Prior Publication Data
US 2014/0257790 A1 Sep. 11, 2014

(30) Foreign Application Priority Data
Mar. 11, 2013 (CN) .......................... 2013 1 0075549

(51) Int. Cl.
*G06F 3/043* (2006.01)
*G06F 3/0488* (2013.01)
*G06F 3/041* (2006.01)
*G06F 3/023* (2006.01)

(52) U.S. Cl.
CPC ............ *G06F 3/0416* (2013.01); *G06F 3/043* (2013.01); *G06F 3/0488* (2013.01); *G06F 3/04883* (2013.01); *G06F 3/0233* (2013.01); *G06F 2203/04106* (2013.01)

(58) Field of Classification Search
CPC .............................. G06F 3/043; G06F 3/04883
See application file for complete search history.

(56) References Cited

U.S. PATENT DOCUMENTS

| 7,777,732 | B2 | 8/2010 | Herz et al. | |
|---|---|---|---|---|
| 8,698,764 | B1* | 4/2014 | Karakotsios | G06F 1/1692 345/173 |
| 9,052,783 | B2 | 6/2015 | Koshiyama et al. | |
| 2002/0051957 | A1* | 5/2002 | Schwarzkopf | G09B 13/04 434/227 |
| 2002/0071705 | A1* | 6/2002 | Zilberman | G06F 3/0202 400/472 |
| 2004/0095327 | A1* | 5/2004 | Lo | G06F 3/0236 345/169 |

(Continued)

FOREIGN PATENT DOCUMENTS

CN 201156246 Y 11/2008
CN 102375599 A 3/2012

OTHER PUBLICATIONS

First Office Action, including Search Report, for Chinese Patent Application No. 201310075549.2, dated Jul. 11, 2016, 7 pages.

*Primary Examiner* — Paras D Shah
*Assistant Examiner* — Bryan S Blankenagel
(74) *Attorney, Agent, or Firm* — Westman, Champlin & Koehler, P.A.

(57) ABSTRACT

The present invention discloses an information processing method and an electronic device. An action by an operator including a user's finger is collected and identified to determine location information and sound information associated with the action, so that only information corresponding to the location information and the sound information associated with the action is inputted. In this way, the user can input different types of information by performing different touch actions, simplifying the user's operation, and improving operation efficiency.

14 Claims, 3 Drawing Sheets

(56) References Cited

U.S. PATENT DOCUMENTS

| | | | |
|---|---|---|---|
| 2005/0148870 A1* | 7/2005 | Dryselius | G06F 3/011 600/437 |
| 2005/0253814 A1* | 11/2005 | Ghassabian | G06F 1/1616 345/168 |
| 2006/0192763 A1* | 8/2006 | Ziemkowski | G06F 1/1632 345/168 |
| 2008/0075368 A1* | 3/2008 | Kuzmin | G06F 3/04883 382/187 |
| 2008/0158170 A1* | 7/2008 | Herz et al. | 345/173 |
| 2008/0316184 A1* | 12/2008 | D'Souza | G06F 3/0418 345/173 |
| 2009/0066690 A1* | 3/2009 | Harrison | G06T 19/006 345/419 |
| 2009/0319943 A1* | 12/2009 | Ha | G06F 3/0236 715/802 |
| 2010/0231522 A1* | 9/2010 | Li | G06F 3/0423 345/169 |
| 2010/0241993 A1* | 9/2010 | Chae | G01C 21/3611 715/830 |
| 2010/0259561 A1* | 10/2010 | Forutanpour | G06F 3/0216 345/660 |
| 2010/0279738 A1* | 11/2010 | Kim | G06F 3/016 455/566 |
| 2011/0018825 A1* | 1/2011 | Kondo | G06F 3/0433 345/173 |
| 2011/0050576 A1* | 3/2011 | Forutanpour | G06F 3/04886 345/168 |
| 2011/0050594 A1* | 3/2011 | Kim et al. | 345/173 |
| 2011/0084914 A1* | 4/2011 | Zalewski | G06F 3/043 345/173 |
| 2011/0210931 A1* | 9/2011 | Shai | 345/173 |
| 2011/0242059 A1* | 10/2011 | Pasquero et al. | 345/177 |
| 2012/0007713 A1* | 1/2012 | Nasiri et al. | 340/5.81 |
| 2012/0032905 A1* | 2/2012 | Koshiyama et al. | 345/173 |
| 2012/0032979 A1* | 2/2012 | Blow | G06F 1/1626 345/647 |
| 2012/0109632 A1* | 5/2012 | Sugiura et al. | 704/3 |
| 2012/0182220 A1* | 7/2012 | Wu | G06F 3/018 345/168 |
| 2012/0189368 A1* | 7/2012 | Jawerth | G06F 3/0216 400/489 |
| 2012/0317521 A1* | 12/2012 | Ludwig | 715/863 |
| 2016/0005150 A1* | 1/2016 | Ghassabian | G06F 3/0488 345/654 |

* cited by examiner

INFORMATION PROCESSING METHOD AND ELECTRONIC DEVICE

CROSS-REFERENCE TO RELATED APPLICATION

This Application claims the benefit and priority of a foreign application filed in China as Application No. 201310075549.2 on Mar. 11, 2013, all of which is incorporated herein by reference.

TECHNICAL FIELD

The present invention relates to the field of electronic devices, and more particularly, to information processing methods and electronic devices.

BACKGROUND

Intelligent electronic devices have become necessities in people's daily lives. Users can communicate with others using instant communication tools or Short Message Service (SMS). Currently, an intelligent electronic device is typically equipped with a touch screen and a virtual keyboard to provide a user with a text input function. In the existing input methods based on virtual keyboard, a predefined virtual key has to be clicked in order to switch between Chinese and English languages input methods. For example, when a default interface is an interface for the Chinese input method, and a user wants to insert English text, he or she needs to switch to the English input method by clicking the key predefined for input method switching, before he or she can start inputting English text. Then, when the user wants to input Chinese text, he or she needs to switch back to the Chinese input method. If the user switches between the Chinese and English input methods frequently, the text input will be inefficient, and thus become inconvenient for the user.

SUMMARY

Embodiments of the present invention provide an information processing method and an electronic device that can improve information input and output efficiency.

According to an embodiment of the present invention, an information processing method is provided. The method is applied in an electronic device and comprises: collecting, by a first collection unit of the electronic device, location information of an operator relative to the first collection unit when the operator performs on the electronic device an operation that satisfies a predetermined condition; collecting, by a second collection unit of the electronic device, sound information generated by the operator during the operation; and determining input information based on the location information and the sound information.

According to another embodiment of the present invention, an electronic device is provided. The electronic device comprises: a first collecting unit configured to collect location information of an operator relative to the first collection unit when the operator performs on the electronic device an operation that satisfies a predetermined condition; a second collection unit configured to collect sound information generated by the operator during the operation; and a determination unit configured to determine input information based on the location information and the sound information.

In the information processing method and the electronic device according to the embodiments of the present invention, an action by an operator is collected and identified to determine location information and sound information associated with the action, so that only information corresponding to the location information and the sound information associated with the action is inputted. In this way, the user can input different types of information by performing different touch actions. Compared with the prior art where the user has to click a virtual function key to switch between information input methods for inputting different information, operation steps can be reduced, and thus operation efficiency can be improved.

BRIEF DESCRIPTION OF THE DRAWINGS

For clear illustration of the solutions according to the embodiments of the present invention or the prior arts, the figures used for describing the embodiments or the prior arts will be briefly introduced in the following. Obviously, the figures described below are only some of the embodiments of the present invention. Starting from these figures, those skilled in the art can obtain other figures without applying any inventive skills.

DETAILED DESCRIPTION OF THE EMBODIMENTS

In the following, the solutions according to the embodiments of the present invention will be described clearly and fully with reference to the figures. Obviously, the embodiments described below are only some, rather than all, of the embodiments. Starting from the embodiments of the present invention, those skilled in the art can obtain other embodiments with applying any inventive skills. All these embodiments are to be encompassed by the scope of the present invention.

Figure 1:
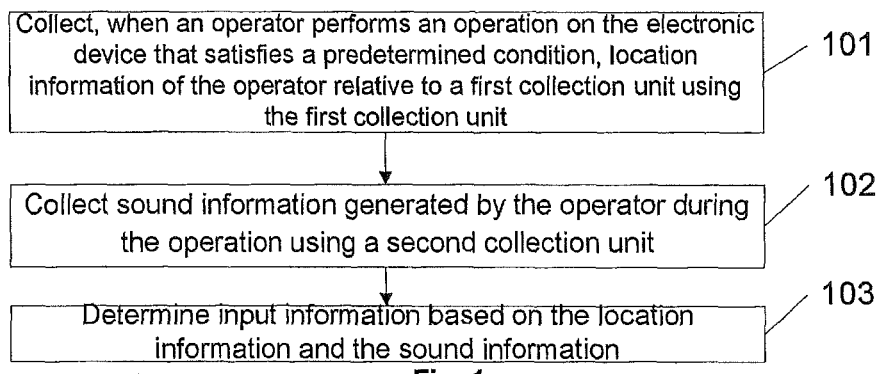
FIG. 1 is a flowchart illustrating an information processing method according to an embodiment of the present invention.

The present invention provides an information processing method. This method may be applied in various electronic devices including smart phones, tablet computers and the like. Such electronic device has a first collection unit for collecting location information associated with a touch operation and the second collection unit for collecting sound information associated with the touch operation. As shown in FIG. 1, the method includes the following steps.

At step 101, when an operator performs on the electronic device an operation that satisfies a predetermined condition, location information of the operator relative to the first collection unit of the electronic device is collected by the first collection unit.

Here, the operator may be any of various portions of a user's finger. The predetermined condition may be satisfied when it is detected that an object touches a sensitive area, such as a surface of a touch screen.

The location information may be identified in Cartesian coordinates provided by the operating system of the electronic device.

At step 102, sound information generated by the operator during the operation is collected by a second collection unit of the electronic device.

Here, the sound information includes volume or frequency or some other characteristic of the sound generated by the operator when it operates the electronic device.

At step 103, input information is determined based on the location information and the sound information.

In the information processing method and the electronic device according to the embodiments of the present invention, an action by an operator is collected and identified to determine location information and sound information associated with the action, so that only information corresponding to the location information and the sound information associated with the action is inputted. In this way, the user can input different types of information by performing different touch actions. Compared with the prior art where the user has to click a virtual function key to switch between information input methods for inputting different information, operation steps can be reduced, and thus operation efficiency can be improved.

Further, in order to improve security and lifetime of the electronic device, the electronic device further includes a first component having a transmittance in a first direction that satisfies a threshold. The first component is provided on a side of the first collection unit. The first direction is a direction from the first collection unit to the first component and is opposite to the direction in which the user views the electronic device.

In this embodiment, preferably the first component may be a transparent glass casing having a size capable of covering an area in the electronic device that is used to display contents. The first component may be a device made of another material having a transmittance. Embodiments of the present invention are not limited in this respect.

Further, the first collection unit may be set to have a transmittance in the first direction that satisfies a threshold. The first collection unit is provided on a side of a display unit. The first direction is a direction from the display unit to the first collection unit. In this case, in the overlapping structure of the electronic device in the first direction, the direction from the display unit to the first collection unit is the same as the direction from the first collection unit to the first component.

Furthermore, the first collection unit includes a first sensitive layer and a second sensitive layer. The display unit is provided between the first and second sensitive layers, thereby reducing the thickness of the entire touch sensitive display unit, reducing the size of the electronic device itself and facilitating user operation. In this case, in the overlapping structure of the electronic device in the first direction, the direction from the second sensitive layer to the display unit, the direction from the display unit to the first sensitive layer and the direction from the first sensitive layer to the first component are all the same.

With this structure, in an embodiment, in the step 101, the first collection unit collects the location information of the operator relative to the first collection unit when the operator touches the first component at a touch location. The location information indicates a projection location obtained by projecting the touch location onto a plane where the first collection unit lies.

In particular, the first collection unit may be implemented as a touch collection module commonly known in touch screen techniques. It may be placed together with the first component (such as a glass casing), so as to obtain the user's touch information directly and accurately. The first collection unit, the first component and the display unit may constitute a commonly known touch screen.

In an embodiment, in the step 102, when the operator touches the first component, the second collection unit collects the sound information generated by the operator's touch with the first component.

In particular, the second collection unit may be a specifically-made audio collector such as a microphone or a vibration detector. Its location may depend on how the second collection unit collects sounds. For example, when the second collection unit receives the sound generated by the operator's touch with the first component and transmitted via air, the second collection unit may be provided inside the electronic device and near the first component. The second collection unit may be provided close to the first component, or at a location at a distance from the first component with no influence on reception of sounds. When the second collection unit receives the sound generated by the operator touching the first component and transmitted via a solid medium, it may be provided close to the first component or integrated into the first component as a part thereof.

Further, in order to allow the user to operate the electronic device conveniently and to be clearly and accurately aware of the information content he or she is currently operating, the electronic device may further include a display unit disposed overlapping the first collection unit. When the display unit displays an image, the first collection unit does not obstruct the image from being perceived by a user.

Figure 2:
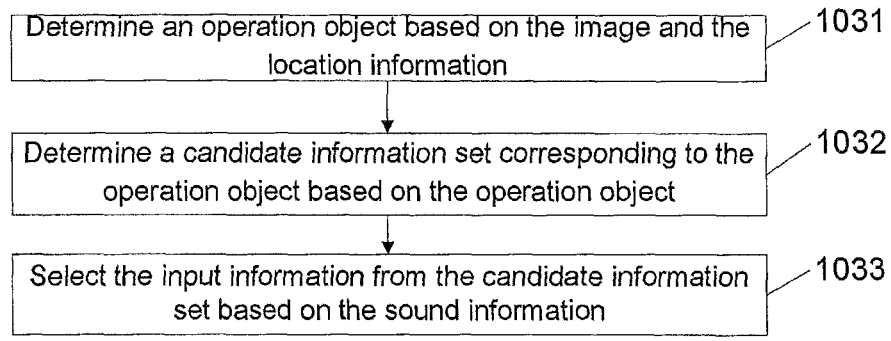
FIG. 2 is a flowchart illustrating another information processing method according to an embodiment of the present invention.

In this case, in the step 103, the input information can be determined based on the image displayed on the display unit, the location information and the sound information. In an embodiment, as shown in FIG. 2, step 103 includes the following steps.

At 1031, an operation object is determined based on the image and the location information.

For example, when the displayed image contains a number of virtual function keys, the electronic device may determine which of the virtual function keys is currently selected by the user based on the location information.

At 1032, a candidate information set corresponding to the operation object is determined based on the operation object.

For example, if the image currently displayed contains a grid of nine virtual keys for inputting letters, among the grid of nine virtual keys, a first operation object corresponds to a candidate information set of {1}, a second operation object corresponds to a candidate information set of {2, A, B, C}, a third operation object corresponds to a candidate information set of {3, D, E, F}, and so on.

It is to be noted that, in order to further facilitate the user operation on the information, in an embodiment of the present invention, the candidate information set corresponding to each operation object may be displayed, such that the user can clearly identify which information he or she can select for inputting.

According to an embodiment of the present invention, there are two schemes for displaying a candidate information set, which will be described below.

In the first scheme, an identifier of at least one item of information in the candidate information set is displayed on the display unit.

For example, when a candidate information set corresponding to an operation object contains two letters, "a" and "A", only the letter "a" is displayed to the user.

In the second scheme, identifiers of all items of information in the candidate information set are displayed on the display unit.

For example, when a candidate information set corresponding to an operation object is {2, a, b, c}, the digit "2" and the three letters "a", "b" and "c" may be displayed to the user, such that the user may be aware of all the different types of information that can be inputted using the single operation object.

Here, in the embodiment of the present invention, the displayed identifiers are not limited to letters and can be symbols or icons.

It is to be noted here that, in order to provide unified operations such that the user can perform the same operation process to operate the same type of operation objects, in this embodiment, when there are at least two operation objects presented at the same time, each of the operation objects may correspond to at least two identifiers. In addition, it is required that the at least two identifiers corresponding to a first object of the at least two operation objects is displayed in a layout identical to that of the at least two identifiers corresponding to a second object of the at least two operation objects.

Figure 3:
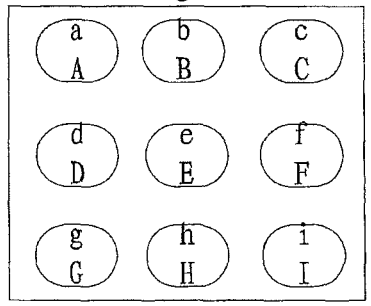
FIG. 3 is a schematic diagram showing a display of an operation object according to an embodiment of the present invention.

For example, if the virtual key 1 may have "a" displayed in its upper portion and "A" displayed in its lower portion, the virtual key 2 needs "b" to be displayed in its upper portion and "B" to be displayed in its lower portion, the virtual key 3 needs "C" to be displayed in its upper portion and "C" to be displayed in its lower portion, and so on. In this way, all the virtual keys of the same type may be configured to have the same upper-lower display layout, which is shown in FIG. 3.

It is to be further noted that, the candidate information set corresponding to each operation object includes at least a first candidate information subset uniquely associated with first sound information and a second candidate information subset uniquely associated with second sound information. The first sound information and the second sound information are different sound information generated by different portions of the operator touching the first component. That is, the user may use different portions of his or her finger such as fingertip, nail, finger prominence or finger joint to tap or press the touch screen to generate different sound information. This is because that the fingertip or nail belongs to keratoderma, the finger prominence is composed of skin and inner muscle, and the finger joint is composed of skin and inner bone. Their different compositions cause different sounds to be generated when they touch the touch screen. Therefore, the different sound information may be associated with different input information. Hence the user can use different portions of his or her finger to input different information.

At step 1033, the input information is selected from the candidate information set based on the sound information.

The specific implementation of the step 1033 will be explained with reference to the above description in connection with the step 1032. For example, when the virtual key 1 has "a" displayed on its upper portion and "A" displayed on its lower portion, the user may select to input the information "a" by clicking the virtual key 1 with his or her fingertip or nail, or the information "A" by pressing the virtual key 1 with his or her finger prominence. This is only an exemplary implementation of the embodiment of the present invention. The scheme for selecting the input information based on the sound information may be dependent on actual situations, e.g., on the contents of the displayed image and the displayed identifiers of the candidate information set.

Figure 4:
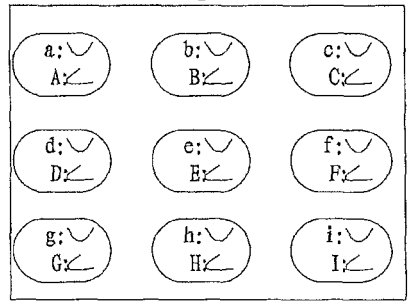
FIG. 4 is a schematic diagram showing another display of an operation object according to an embodiment of the present invention.

Further, in order to facilitate the user operation, referring to the display shown in FIG. 4, a respective portion that can be used by the user to touch may be displayed on each operation object. In order to improve utilization of display space on the screen, the portion that can be used by the user to touch may be displayed just on the first, the last, or the middle one of all the operation objects, while nothing is displayed for the other operation objects. This prevents a large display area from being occupied by unnecessary information due to multiple occurrences of the same prompt information.

Figure 5:
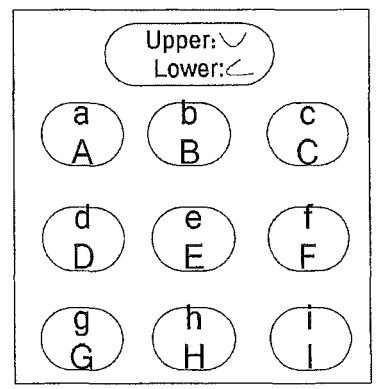
FIG. 5 is a schematic diagram showing a further display of an operation object according to an embodiment of the present invention.

Alternatively, referring to the display shown in FIG. 5, the portion(s) that can be used by the user to touch may be displayed at a separate location. Both of the fogoing schemes may be used to prompt the user which input method can be used to input which information. Here, the U-shaped symbol represents fingertip or nail, and the C-shaped symbol represents finger prominence. The symbol or icon of each touch portion is provided for simulate a sectional view of the user's fingertip, nail or finger prominence when the user uses his or her fingertip, nail or finger prominence to touch the screen. In addition to the fingertip, nail or finger prominence, in this embodiment, a L-shaped symbol may be used for representing finger joint.

Alternatively, the text "fingertip or nail", "finger prominence," or "finger joint," or their corresponding abbreviations may be directly used as the prompt information.

The above embodiment only gives two possible schemes as described above. Any other schemes that clearly and intuitively indicate the symbols or icons of the touch portions to the user can be used in the solutions according to the present invention.

In the information processing method and the electronic device according to the embodiments of the present invention, an action by an operator is collected and identified to determine location information and sound information associated with the action, so that only information corresponding to the location information and the sound information associated with the action is inputted. In this way, the user can input different types of information by performing different touch actions. Compared with the prior art where the user has to click a virtual function key to switch between information input methods for inputting different information, operation steps can be reduced, and thus operation efficiency can be improved.

Figure 6:
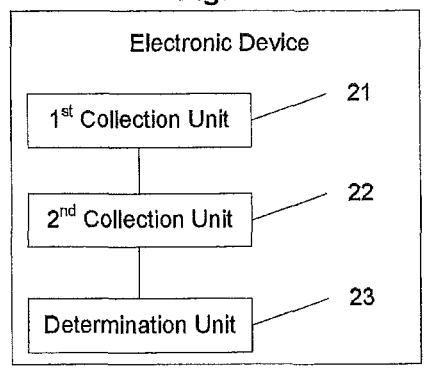
FIG. 6 is a block diagram of an electronic device according to an embodiment of the present invention.

According to another embodiment of the present invention, an electronic device is also provided. As shown in FIG. 6, the electronic device includes a first collection unit 21, a second collection unit 22 and a determination unit 23.

The first collecting unit 21 is configured to collect, when an operator performs an operation on the electronic device that satisfies a predetermined condition, location information of the operator relative to the first collection unit 21.

The second collection unit 22 is configured to collect sound information generated by the operator during the operation.

The determination unit 23 is configured to determine input information based on the location information and the sound information.

Figure 7:
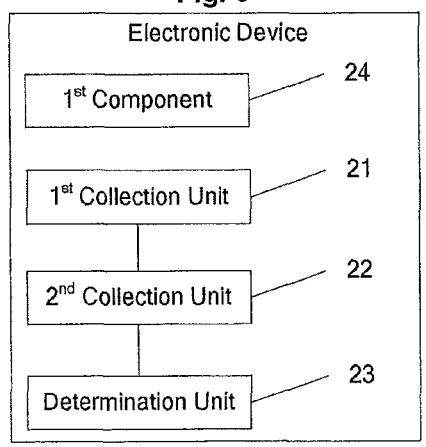
FIG. 7 is a block diagram of another electronic device according to an embodiment of the present invention.

Optionally, as shown in FIG. 7, the electronic device further comprises a first component 24 having a transmittance in a first direction that satisfies a threshold. The first component 24 is provided on a side of the first collection unit 21. The first direction is a direction from the first collection unit 21 to the first component 24.

The first collection unit 21 is configured to collect the location information of the operator relative to the first collection unit 21 when the operator touches the first component 24. The location information indicates a projection location obtained by projecting the location at which the operator touches the first component 24 onto a plane in which the first collection unit 21 lies.

The second collection unit 22 is configured to collect, when the operator touches the first component 24, the sound information generated by the operator's touch with the first component 24.

Figure 8:
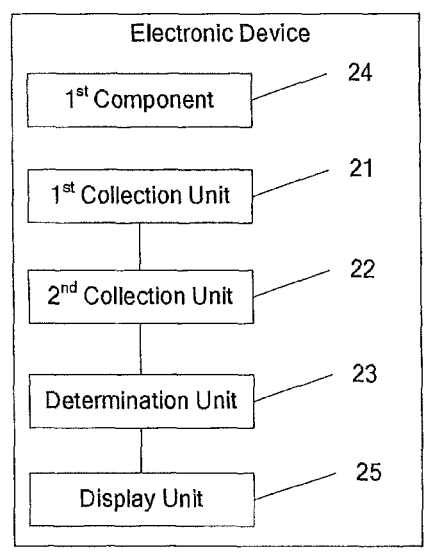
FIG. 8 is a block diagram of a further electronic device according to an embodiment of the present invention.

Optionally, as shown in FIG. 8, the electronic device further comprises a display unit 25 disposed overlapping the first collection unit 21. When the display unit 25 displays an image, the first collection unit 21 does not obstruct the image from being perceived by a user.

The determination unit 23 is configured to determine the input information based on the image displayed on the display unit 25, the location information and the sound information.

Figure 9:
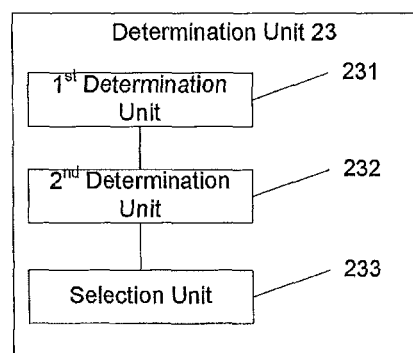
FIG. 9 is a block diagram of a still further electronic device according to an embodiment of the present invention.

Optionally, as shown in FIG. 9, the determination unit 23 includes: a first determination module 231 configured to determine an operation object based on the image and the location information; a second determination module 232 configured to determine a candidate information set corresponding to the operation object based on the operation object; and a selection module 233 configured to select the input information from the candidate information set based on the sound information.

Optionally, the display unit 25 is further configured to display an identifier of at least one item of information in the candidate information set, or display an identifier of each item of information in the candidate information set.

Optionally, when there are at least two operation objects, each of the operation objects corresponds to at least two identifiers. The at least two identifiers corresponding to a first object of the at least two operation objects is displayed in a layout identical to that of the at least two identifiers corresponding to a second object of the at least two operation objects.

Optionally, the candidate information set corresponding to each operation object comprises at least a first candidate information subset associated with first sound information and a second candidate information subset associated with second sound information.

Optionally, the first sound information and the second sound information are different sound information generated by different portions of the operator touching the first component.

In the electronic device according to the embodiment of the present invention, an action by an operator is collected and identified to determine location information and sound information associated with the action, so that only information corresponding to the location information and the sound information associated with the action is inputted. In this way, the user can input different types of information by performing different touch actions. Compared with the prior art where the user has to click a virtual function key to switch between information input methods for inputting different information, operation steps can be reduced, and thus operation efficiency can be improved.

From the above description of the embodiments, it can be appreciated by those skilled in the art that the present invention can be implemented in software in combination with necessary general purpose hardware. Of course the present invention can be implemented in hardware, but the software implementation will be preferable in most cases. In view of this, the technical solutions according to the embodiments of the present application, or in other words a part thereof which makes contribution over the prior art, can be substantially embodied in a form of software product. The computer software product can be stored in a readable storage media, such as floppy disk, magnetic disk, optical disc and the like, containing instructions which cause a computer device (which can be a personal computer, a server, a network device or the like) to perform the method according to the embodiments of the present application.

While the embodiments of the present invention have been described above, the scope of the present invention is not limited to these embodiments. Those skilled in the art can make further modifications and changes to these embodiments without departing from the scope of the present invention. These modifications and changes are to be encompassed by the scope of the present invention. Therefore, the scope of the present invention is defined only by the claims as attached.

What is claimed is:

1. A method for inputting a character in an electronic device, the method comprising:
   displaying, on a display unit of the electronic device, symbols representing different portions of an operator for performing a touch operation, wherein the operator comprises a finger, and a plurality of virtual keys, wherein at least two characters are displayed on each of the virtual keys and include a capital form of an alphabetic character and also a lowercase form of the alphabetic character;
   collecting, by a touch collector of the electronic device, location information of the operator relative to the touch collector when the operator performs a touch operation on the display unit, the location information indicating a position where the operator touches the display unit of the electronic device;
   collecting, by an audio collector of the electronic device, sound information generated by the operator touching the display unit, the sound information indicating which of the different portions of the operator contacts with the display unit, wherein contact of the different portions with the display unit generates different sound information for selecting different input characters; and
   determining an input character based on both the location information and the sound information by
   selecting one of the plurality of virtual keys displayed on the display unit of the electronic device based on the location information, and
   selecting either the capital form or the lowercase form of the alphabetic character displayed on the selected virtual key based on the collected sound information.

2. The method of claim 1, wherein the electronic device comprises a first component having a transmittance in a first direction that satisfies a threshold, the first component being provided on a side of the touch collector, the first direction being a direction from the touch collector to the first component, and wherein said collecting, by the touch collector, the location information of the operator relative to the touch collector comprises collecting, by the touch collector, the location information of the operator relative to the touch collector when the operator touches the first component, and the location information indicates a projection location obtained by projecting the touch location at which the operator touches the first component onto a plane in which the touch collector lies, and wherein said collecting, by the audio collector, the sound information generated by the operator during the operation comprises collecting, by the audio collector, the sound information generated by the operator's touch with the first component when the operator touches the first component.

3. The method of claim 1, wherein the display unit overlaps the touch collector, and when the display unit displays an image, the touch collector does not obstruct the image from being perceived by a user.

4. The method of claim 1, further comprising:
displaying, on the display unit, an identifier of at least one item of information in the candidate character set; or
displaying, on the display unit, an identifier of each character in the candidate character set.

5. The method of claim 4, wherein
when there are at least two keys in the virtual keypad, each of the keys corresponds to at least two identifiers, and
the at least two identifiers corresponding to a first key of the at least two keys is displayed in a layout identical to that of the at least two identifiers corresponding to a second key of the at least two keys.

6. The method of claim 5, wherein
the candidate character set corresponding to one of the keys comprises at least a first candidate character subset associated with first sound information and a second character information subset associated with second sound information.

7. The method of claim 6, wherein the first sound information and the second sound information are different sound information generated by different portions of the operator touching the first component.

8. An electronic device, comprising:
a display unit configured to display symbols representing different portions of an operator for performing a touch operation, wherein the operator comprises a finger, and a plurality of virtual keys, wherein at least two characters are displayed on each of the virtual keys and include a capital form of an alphabetic character and also a lowercase form of the alphabetic character;
a touch collector configured to collect location information of the operator relative to the touch collector when the operator performs a touch operation on the display unit, the location information indicating a position where the operator touches the display unit;
an audio collector configured to collect sound information generated by the operator touching the display, the sound information indicating which of the different portions of the operator contacts with the display unit, wherein contact of the different portions with the display unit generates different sound information for selecting different input characters; and
a processor configured to determine an input character based on both the location information and the sound information by
selecting one of the virtual keys displayed on the display unit based on the location information, and
selecting either the capital form or the lowercase form of the alphabetic character displayed on the selected virtual key based on the collected sound information.

9. The electronic device of claim 8, wherein the electronic device comprises a first component having a transmittance in a first direction that satisfies a threshold, the first component being provided on a side of the touch collector, the first direction being a direction from the touch collector to the first component, and
wherein the touch collector is configured to collect the location information of the operator relative to the touch collector when the operator touches the first component, and the location information indicates a projection location obtained by projecting the touch location at which the operator touches the first component onto a plane in which the touch collector lies, and
wherein the audio collector is configured to collect the sound information generated by the operator's touch with the first component when the operator touches the first component.

10. The electronic device of claim 9, wherein the display unit overlaps the touch collector, and when the display unit displays an image, the touch collector does not obstruct the image from being perceived by a user.

11. The electronic device of claim 8, wherein the display unit is further configured to display an identifier of at least one character in the candidate character set, or to display an identifier of each character in the candidate character set.

12. The electronic device of claim 11, wherein
when there are at least two keys in the virtual keys, each of the keys corresponds to at least two identifiers, and
the at least two identifiers corresponding to a first key of the at least two keys is displayed in a layout identical to that of the at least two identifiers corresponding to a second key of the at least two keys.

13. The electronic device of claim 11, wherein
the candidate character set corresponding to each key comprises at least a first candidate character subset associated with first sound information and a second candidate character subset associated with second sound information.

14. The electronic device of claim 13, wherein the first sound information and the second sound information are different sound information generated by different portions of the operator touching the first component.

* * * * *